United States Patent
Kim et al.

(10) Patent No.: US 7,580,546 B2
(45) Date of Patent: Aug. 25, 2009

(54) MARKER-FREE MOTION CAPTURE APPARATUS AND METHOD FOR CORRECTING TRACKING ERROR

(75) Inventors: Sung-Eun Kim, Daejon (KR); Chang-Joon Park, Daejon (KR); In-Ho Lee, Daejon (KR); Hyun-Bin Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 719 days.

(21) Appl. No.: 11/283,191

(22) Filed: Nov. 18, 2005

(65) Prior Publication Data

US 2006/0126895 A1 Jun. 15, 2006

(30) Foreign Application Priority Data

Dec. 9, 2004 (KR) .................. 10-2004-0103791
Mar. 25, 2005 (KR) .................. 10-2005-0025158

(51) Int. Cl.
*G06K 9/00* (2006.01)
(52) U.S. Cl. ...................... 382/103; 382/206
(58) Field of Classification Search .............. 382/103, 382/107, 190, 195, 201, 206, 291
See application file for complete search history.

(56) References Cited

U.S. PATENT DOCUMENTS 7,239,718 B2 * 7/2007 Park et al. .................. 382/103
7,257,237 B1 * 8/2007 Luck et al. .................. 382/103
2003/0219147 A1 11/2003 Nishiura

FOREIGN PATENT DOCUMENTS

KR 1020000017755 A 4/2000
KR 1020040055310 A 6/2004

OTHER PUBLICATIONS

Sung-Eun Kim, "Analysis of 3D Human Motion In A Computer Vision-Based Motion Capture System", Proceedings of the 7th Korea-Russia International Symposium, KORUS 2003, pp. 329-334.

* cited by examiner

*Primary Examiner*—Phuoc Tran
(74) *Attorney, Agent, or Firm*—Blakely, Sokoloff, Taylor & Zafman

(57) ABSTRACT

A marker-free motion capture apparatus having a function of correcting a tracking error and a method thereof are disclosed. The apparatus includes: a grouping unit for grouping feature candidates located within a threshold distance on a three-dimensional space at a previous time; a feature point selecting unit for generating a first curve connecting a predetermined number of feature points, and selecting a feature candidate closest to the first curve as a feature point of a previous time; a feature point correcting unit for generating a second curve connecting a predetermined number of feature points including the feature point of a previous time, and correcting a feature point of a current time calculated based on a Kalman filtering scheme using the second curve; and a controlling unit for calculating a location of a feature point of each time using a Kalman filtering scheme and generally controlling the marker-free motion capture apparatus.

14 Claims, 7 Drawing Sheets

● : LOCATION OF FEATURE
■ : LOCATION OF GROUPED FEATURE CANDIDATE
    ONE OF GROUPED FEATURE CANDIDATE IS FINALLY SELECTED
▲ : LOCATION OF FEATURE OBTAINED THROUGH KALMAN FILTERING

MARKER-FREE MOTION CAPTURE APPARATUS AND METHOD FOR CORRECTING TRACKING ERROR

FIELD OF THE INVENTION

The present invention relates to a marker-free motion capture apparatus and method for correcting a tracking error; and, more particularly, to a marker-free motion capture apparatus having a function of correcting a tracking error by grouping feature candidates of a target object located within a threshold distance in a three-dimensional space before a previous time (t−1), selecting one of feature candidates which is closest to a curve passing a predetermined number of feature points as a feature point, selecting a feature point having a highest possibility to be selected among un-selected feature points as a virtual candidate, virtually tracking the virtual candidate, correcting a feature point of a current time (t) using a curve passing a predetermined number of feature points including the selected feature point, and registering valid candidates in virtual candidates as a new feature point when the corrected feature point of a current time does not include a feature candidate group or feature candidates matched with a predicted value at a child node, and a method thereof.

DESCRIPTION OF THE PRIOR ART

A marker-free motion capture apparatus according to the present invention captures motions of a target object using a plurality of cameras without using a marker or a sensor, extracts two-dimensional data of the target object such as a head, two hands or two feet, and restores motions of the target object in real-time by calculating three-dimensional positions of the extracted two-dimensional data.

A curve of a cubic equation is used as an example for explaining an embodiment of the present invention. Accordingly, the present invention is not limited by the curve of the cubic equation.

A motion capture technology is widely used in various three-dimensional image contents producing fields such as animation, movie, broadcasting product and game to produce realistic and natural animation. Such a motion capture technology produces realistic animation by attaching markers to a target object, capturing a motion image of markers and restoring the captured motion image as three-dimensional image. The markers react to infrared ray.

A real-time marker-free motion capture technology using a computer vision captures a motion of a target object such as a person in real-time without attaching a marker or a sensor to the target object. Generally, more than two color cameras are used to capture images, the captured motion image is analyzed to extract target portions among the target object such as two hands, two feet and a head, and the extracted data is restored as positions in three-dimensional space.

The real-time marker-free motion capture technology may have lower accuracy than the motion capture technology using a marker, but it does not require a complicated preparation steps to capture motion images. That is, a plurality of markers is not required to be attached at the target object.

The most important factor of motion capture technology is precious motion restoration of the target object. Especially, is very difficult to preciously and distinguishably restore motions of target objects having identical features such as two hands, and two feet.

For example, since two hands of a human move freely compared to other body parts of the human, one of hands is often hided by other body parts of the human or by other hand when analyzing images obtained by the marker-free motion capture using computer vision.

Especially, if more than two regions are closely adjacent and if they are transformed to 3 dimensional coordinates, distance errors from ignorable distance to 10 s centimeters may be generated when pixel errors on two-dimensional plane is converted to three-dimensional coordinate. Therefore, it is very important to properly match regions in each image.

FIG. 1 shows generation of three-dimensional coordinate from two-dimensional image data.

Referring to FIG. 1, in order to obtain correct three dimensional coordinates of a target object, it is very important to properly match feature candidates in each of images. If theses features are adjacent in an image, the number of cases is generated as many as 'feature candidates in left side image X feature candidates in right side image'. It is because that a valid error must be allowed for spatial location for modeling a target object having variable shape and size as one feature. If a feature is in a threshold distance of an error range, the feature must be treated as a candidate feature.

As shown in FIG. 1, two points $m_l^1$, $m_l^2$ are located on a left image plane $\pi_l$ based on an origin $O_l$ of a left camera.

Furthermore, two points $m_r^1$, $m_r^2$ are located on a right image plane $\pi_r$ based on an origin $O_r$ of a right camera.

Herein, the point $m_l^1$ from the origin $O_l$ crosses to the point $m_r^1$ from the origin $O_r$ at a point $M_{11}$ on a three-dimensional space, and the point $m_l^1$ from the origin $O_l$ meets the point $m_r^2$ from the origin $O_r$ at a point $M_{12}$ on a three-dimensional space. Furthermore, the point $m_l^2$ from the origin $O_l$ crosses to the point $m_r^1$ from the origin $O_r$ at a point $M_{21}$ on a three-dimensional space, and the point $m_l^2$ from the origin $O_l$ meets the point $m_r^2$ from the origin $O_r$ at a point $M_{22}$ on a three-dimensional space.

Among the four points, the two points are real positions of two regions and other two points are ghost points which are faulty points generated by a left matching and a right matching.

In order to track a target object, there are many tracking schemes introduced. Among the introduced tracking schemes, the most generalized scheme is a Kalman filtering scheme that uses a probabilistic prediction. The Kalman filtering scheme predicts a location of feature in a next image frame based on motions obtained from previous image frames. The Kalman filtering scheme has been proved to have a superior performance in various industrial fields.

Hereinafter, a conventional motion capturing method using the Kalman filtering scheme will be described in more detail. The conventional motion capturing method predicts locations of future feature points based on a track of previously inputted feature points of target object. After then, a location of feature point is decided using the predicted value and observed values from the inputted image. By repeatedly performing the predicting and deciding the feature points, the target object is tracked according to the conventional motion capturing method.

Such a Kalman filtering scheme treats a head, two hands, and two feet as single independent feature similar to a marker-free motion capture system using a vision sensor. Therefore, the Kalman filtering scheme is very suitable tracking method for analyzing theses motions.

However, there is a plurality of feature points located near to the predicted location, and one of the feature points near to the predicted location must be selected according to the Kalman filtering scheme. Therefore, the Kalman filtering scheme may generate different tracking results according to the selected feature point although the Kalman filtering scheme has a superior tracking performance.

That is, the predicted values obtained from a current image frame and the feature points near to the predicted values are highly reliable feature candidates in the current image frame. Therefore, the tracking result is not seriously influenced although any one of the feature points is selected. After then, movement of each feature point is predicted based on the tracking information obtained from previous image frames. Accordingly, a selected feature point may not be a valid candidate or a direction of movement may be significantly different from a target feature point. Therefore, tracking errors may increase in proportional to a time.

Furthermore, it is impossible to correct errors of previous operations by previously computing entire operation and using the computing result because a real-time tracking system using the probabilistic prediction scheme such as the real-time marker-free motion capture system must output a result instantly after performing an operation of operator.

Therefore, there is a great demand of a real-time marker-free motion capture system including a tracking error correction function for quickly correcting an error.

SUMMARY OF THE INVENTION

It is, therefore, an object of the present invention to provide a marker-free motion capture apparatus having a function of correcting a tracking error by grouping feature candidates of a target object located within a threshold distance in a three-dimensional space before a previous time (t−1), selecting one of feature candidates which is closest to a curve passing a predetermined number of feature points as a feature point, and correcting a feature point of a current time (t) using a curve passing a predetermined number of feature points including the selected feature point, and a method thereof.

It is another object of the present invention to provide a marker-free motion capture apparatus having a function of correcting a tracking error by grouping feature candidates of a target object located within a threshold distance in a three-dimensional space before a previous time (t−1), selecting one of feature candidates which is closest to a curve passing a predetermined number of feature points as a feature point, selecting a feature point having highest possibility to be selected among unselected feature candidates as a virtual candidate, virtually tracking the virtual candidate, correcting a feature point of a current time (t) using a curve passing a predetermined number of feature points including the selected feature point, and registering validate candidates in virtual candidates as a new feature point when the corrected feature point of a current time does not include a feature candidate group or feature candidates matched with a predicted value at a child node, and a method thereof.

In accordance with one aspect of the present invention, there is provided a marker-free motion capture apparatus having a function of correcting a tracking error, including: a grouping unit for grouping feature candidates located within a threshold distance on a three-dimensional space at a previous time (t−1); a feature point selecting unit for generating a first curve connecting a predetermined number of feature points, and selecting a feature candidate closest to the first curve among the grouped feature candidates as a feature point of a previous time (t−1); a feature point correcting unit for generating a second curve connecting a predetermined number of feature points including the feature point of a previous time (t−1) selected at the feature point selecting unit, and correcting a feature point of a current time (t) calculated based on a Kalman filtering scheme using the second curve; and a controlling unit for calculating a location of a feature point of each time using a Kalman filtering scheme and generally controlling the unit of the marker-free motion capture apparatus.

In accordance with another aspect of the present invention, there is provided a method of correcting a tracking error in a marker-free motion capture apparatus, the method including the steps of: a) grouping feature candidates located within a threshold distance on a three-dimensional space at a previous time (t−1); b) generating a first curve connecting a predetermined number of feature points c) selecting a feature candidate closest to the first curve among the grouped feature candidates as a feature point of a previous time (t−1); d) generating a second curve connecting a predetermined number of feature points including the selected feature points of a previous time (t−1); and e) correcting a feature point of a current time (t) calculated based on a Kalman filtering scheme using the second curve.

In accordance with still another aspect of the present invention, there is provided a marker-free motion capture apparatus having a function of correcting a tracking error, including: a grouping unit for grouping feature candidates located within a threshold distance on a three-dimensional space at a previous time (t−1); a feature point selecting unit for generating a first curve connecting a predetermined number of feature points, selecting a feature candidate closest to the first curve among the grouped feature candidates as a feature point of a previous time (t−1), and selecting at least one of feature candidates which is next closest to the first curve as a virtual candidate of a previous time (t−1); a virtual tracking unit for tracking the virtual candidate of the previous time (t−1) selected at the feature point selecting unit; a feature point correcting unit for generating a second curve connecting a predetermined number of feature points including the feature point of a previous time (t−1) selected at the feature point selecting unit, and correcting a feature point of a current time (t) calculated based on a Kalman filtering scheme using the second curve; and a controlling unit for registering a valid candidate in a virtual candidate tracked at the virtual tracking unit when the corrected feature point of the current time (t) does not have feature points in a lower node.

In accordance with further still another aspect of the present invention, there is provided a method of correcting a tracking error in a marker-free motion capture apparatus, the method including the steps of: a) grouping feature candidates located within a threshold distance on a three-dimensional space at a previous time (t−1); b) generating a first curve connecting a predetermined number of feature points; c) selecting a feature candidate closest to the first curve among the grouped feature candidates as a feature point of a previous time (t−1); d) selecting at least one of feature candidates which is secondly closest to the first curve as a virtual candidate of a previous time (t−1); e) tracking the virtual candidate of the previous time (t−1); f) generating a second curve connecting a predetermined number of feature points including the feature point of a previous time (t−1); g) correcting a feature point of a current time (t) calculated based on a Kalman filtering scheme using the second curve; and h) registering a valid candidate in a virtual candidate tracked at the virtual tracking unit when the corrected feature point of the current time (t) does not have feature points in a lower node.

The marker-free motion capture apparatus having a function of correcting the tracking error according to the present invention performs a tracking operation by selecting candidates having the highest reliability when there is a plurality of reliable candidates located at a probabilistic predicted candidate location while tracking, performs a virtual tracking operation on remained candidates by internal computation, and corrects an error by returning back to a previous time of tracking fail.

The marker-free motion capture apparatus having a function of correcting the tracking error according to the present invention is introduced to overcome a limitation of a real-time system not providing motions of body portions to be shown in a future. The present invention automatically detects a tracking error when the tracking error is generated because an error is allowed to generate in a computation result of a tracking algorithm, and quickly and stably corrects the tracking error without a time delay for additional computation.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings.

Figure 2:
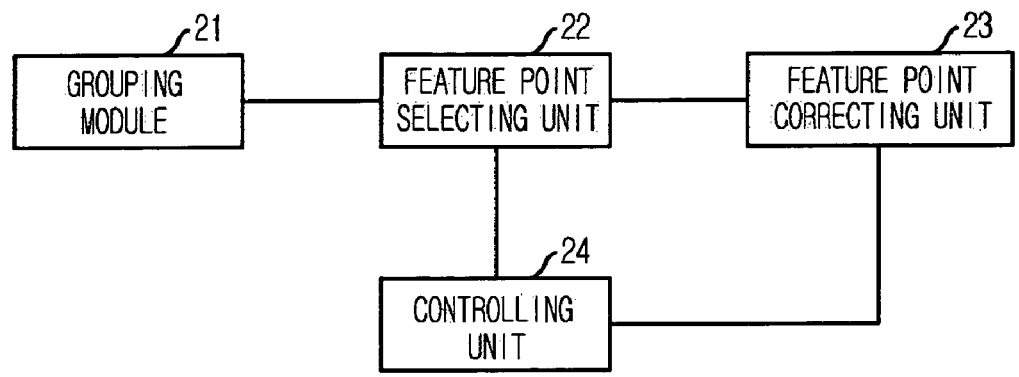
FIG. 2 is a diagram illustrating a marker-free motion capture apparatus having a function of correcting a tracking error in accordance with a preferred embodiment of the present invention.

FIG. 2 is a diagram illustrating a marker-free motion capture apparatus having a function of correcting a tracking error in accordance with a preferred embodiment of the present invention.

Referring to FIG. 2, the marker-free motion capture apparatus having a function of correcting a tracking error according to the present embodiment includes: a grouping module 21 for grouping feature candidates located within a threshold distance in a three-dimensional space at a previous time (t−1); a feature point selecting unit 22 for generating a curve connecting a predetermined number of feature points and selecting a feature candidate closest to the generated curve among the grouped feature candidates as a feature point of a previous time (t−1); a feature point correcting unit 23 for generating a curve connecting a predetermined number of feature points including the feature point of the previous time (t−1) selected by the feature point selecting unit 22, and correcting a feature point of a current time which is calculated according to a Kalman filtering scheme using the generate curve; and a controlling unit 24 for computing a location of a feature point at each time using the Kalman filtering scheme and generally controlling the elements of the marker-free motion capture apparatus.

Herein, the feature point selecting unit 22 generates a curve of cubic equation passing feature points of previous times (t−2, t−3 and t−4) and a feature point of a current time (t) through the Kalman filtering scheme.

Also, the feature point correcting unit 23 generates the curve of a cubic equation passing feature points of the previous times (t−1, t−2 and t−3).

Figure 3:
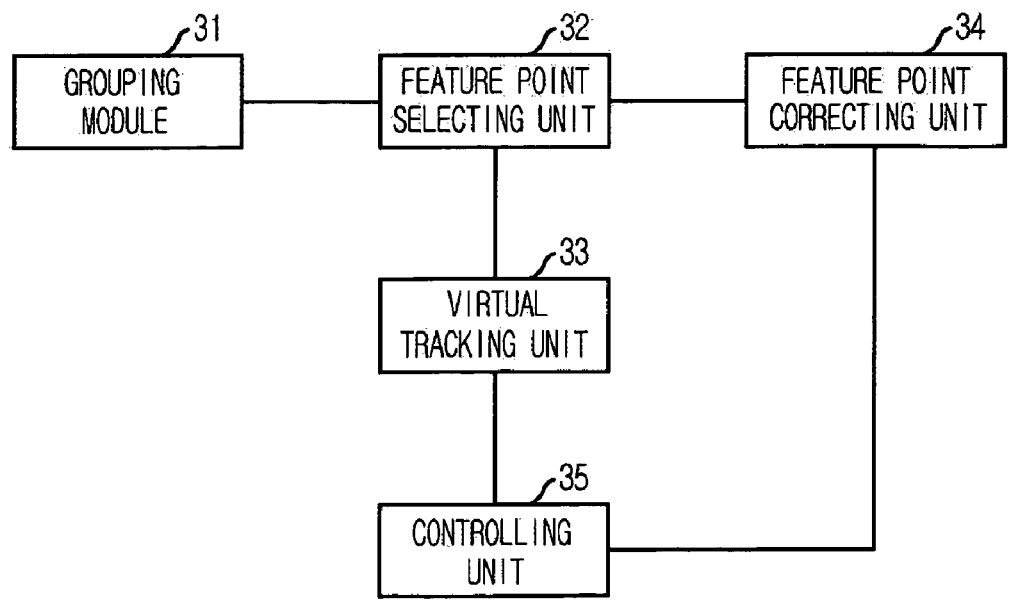
FIG. 3 is a diagram depicting a marker-free motion capture apparatus having a function of correcting a tracking error in accordance with another embodiment of the present invention.

FIG. 3 is a diagram depicting a marker-free motion capture apparatus having a function of correcting a tracking error in accordance with another embodiment of the present invention.

As shown in FIG. 3, the marker-free motion capture apparatus having a function of correcting a tracking error according to another embodiment includes: a grouping module 31 for grouping feature candidates located within a threshold distance in a three-dimensional space at a previous time (t−1); a feature point selecting unit 32 for generating a curve connecting a predetermined number of feature points, selecting a feature candidate closest to the generated curve among the grouped feature candidates as a feature point of a previous time (t−1), and selecting at least one of feature candidates next closest to the generated curve as a virtual candidate of a previous time (t−1); a virtual tracking unit 33 for tracking the virtual candidate of the previous time (t−1) selected at the feature point selecting unit 32; a feature point correcting unit 34 for generating a curve connecting a predetermined number of feature points including the feature point of the previous time (t−1) selected by the feature point selecting unit 32, and correcting a feature point of a current time which is calculated according to a Kalman filtering scheme using the generate curve; and a controlling unit 35 for registering valid candidates in virtual candidates tracked by the virtual tracking unit 33 as a new feature point when the corrected feature point of the current time.

Herein, the feature point selecting unit 32 generates a curve of cubic equation passing feature points of previous times (t−2, t−3 and t−4) and a current time (t) through the Kalman filtering scheme.

Also, the feature point correcting unit 33 generates the curve of cubic equation passing feature points of the previous times (t−1, t−2 and t−3).

The marker-free motion capture apparatus according to another embodiment generates a tree structure and the tree structure increases while tracking the feature point and the virtual candidates. In order to prevent infinitely increasing the tree structure, the controlling unit 35 assumes that the feature points selected before a predetermined number of frames are correctly selected when the virtual candidates (V candidate) are not selected as a feature point (R candidate) for a predetermined number of frames and deletes virtual candidates from the tree structure.

Furthermore, the controlling unit 35 deletes the virtual candidates when the feature point and the virtual candidate simultaneously track identical candidates for a predetermined number of frames. Herein, the curve is a curve of a cubic equation, and the predetermined number of frames is four.

Figure 4:
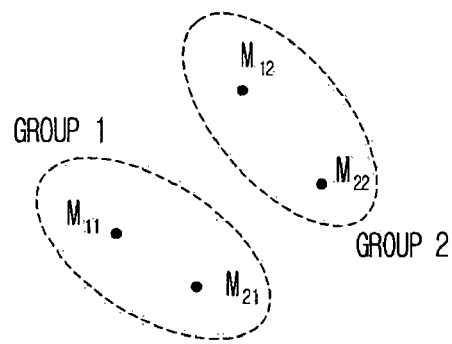
FIG. 4 is a view showing a grouping step for correcting a tracking error in accordance with a preferred embodiment of the present invention.

FIG. 4 is a view showing a grouping step for correcting a tracking error in accordance with a preferred embodiment of the present invention.

Figure 1:
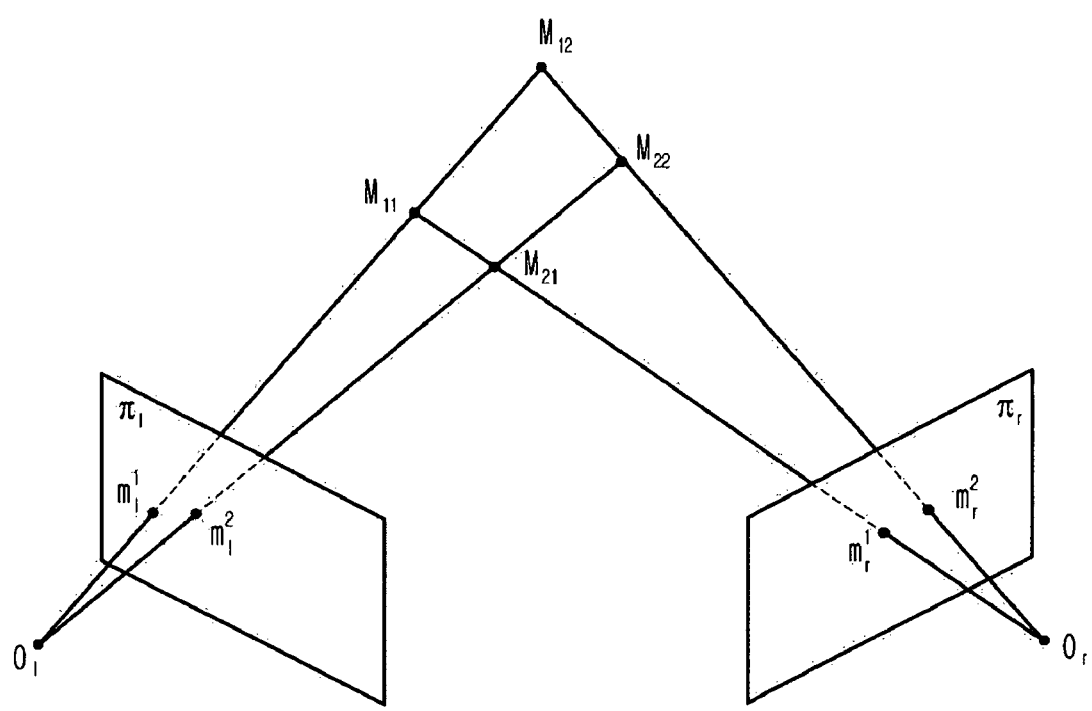
FIG. 1 is a view showing generation of three-dimensional space coordinate from two-dimensional image data.

As shown in FIG. 4, the feature candidates located within a threshold distance are grouped in a three-dimensional space generated through a step shown in FIG. 1.

Accordingly, a group 1 is $M_{11}$ and $M_{12}$, and a group 2 is $M_{21}$ and $M_{22}$. The grouping information is used to correct a tracking error at one frame previous time (t−1). That is, the grouping information is not used at the current time (t).

A conventional tracking routine, which predicts a future value based on a time domain as like as the general Kalman filtering scheme, obtains final locations of features in a current frame based on predicted values of a current time (t) which are calculated at a previous time (t−1) and measured values at the current time (t). However, the tracking error correcting routine according to the present embodiment is performed at a previous time (t−1) which is one frame later than the conventional tracking routine in order to increase reliability. Herein, a cubic equation using four points may be used for correcting the tracking error. That is, a feature located at a most smoothly expressed portion of a curve is selected as a candidate.

Figure 5:
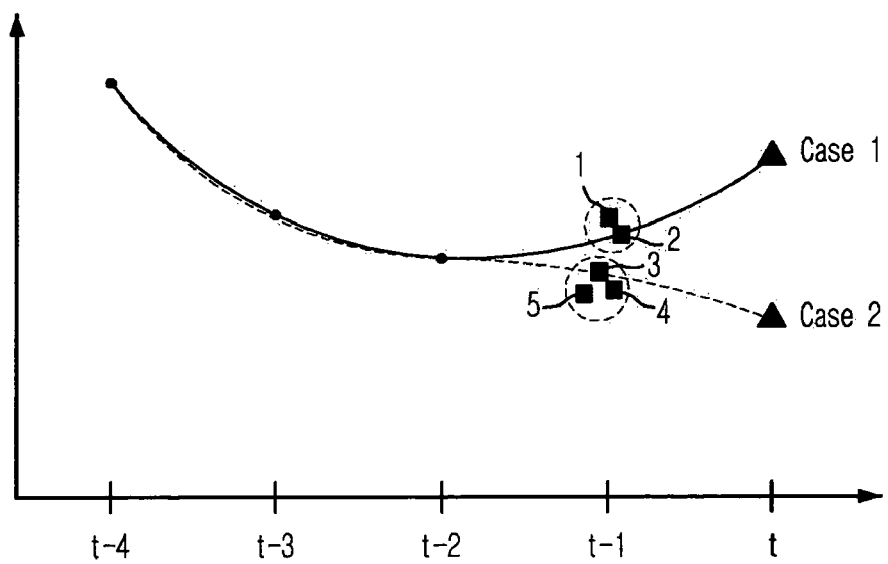
FIG. 5 is a graph for explaining a method for correcting a tracking error in a marker-free motion capture apparatus in accordance with a preferred embodiment of the present invention.

FIG. 5 is a graph for explaining a method for correcting a tracking error in a marker-free motion capture apparatus in accordance with a preferred embodiment of the present invention.

As shown in FIG. 5, it assumes that there are two groups in frames obtained at a previous time (t−1) and a plurality of feature candidates in each of the groups. When a tracking routine is progressed until a current time (t) by inputting a new frame, each track of features in previous times (t−4, t−3, t−2 and t) is connected using a cubic equation and a feature candidate closest to the generated curve is selected among the feature candidates of a previous time (t−1) as a final feature point of the time (t−1).

If location values of feature candidates obtained at a time (t) are shown as 'case 1' in FIG. 5, a feature 2 is selected as a feature point of the previous time (t−1) since the feature 2 is closest to the curve. If the location values of feature candidates obtained at a time (t) are shown as 'case 2 ' in FIG. 5, a feature 3 is selected as a feature point of the previous time (t−1).

Hereinafter, the selected feature candidate is defined as a R candidate. Also, candidate features, which are not selected but have high reliability, are defined as V candidates. The R candidate is used as a body region for real tracking, and the V candidates are internally used to correct a tracking error because a tracking error may be included in a tracking result obtained at a current time (t). A feature candidate 1 is selected in the case 1 of FIG. 5 as the V candidate, and a feature candidate 4 is selected in the case 2 of FIG. 5 as the V candidate. Herein, feature candidates 4 and 5 may be selected as the V candidate in the case 2 according to a predetermined threshold distance.

FIGS. 6A to 6F are views for explaining a method for correcting a tracking error in a marker-free motion capture apparatus in accordance with a preferred embodiment of the present invention.

Figure 6A:
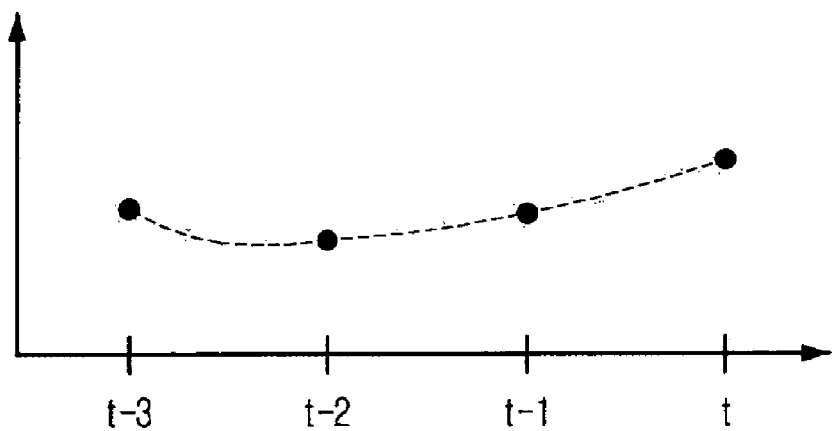
FIGS. 6A to 6F are graphs for explaining a method for correcting a tracking error in a marker-free motion capture apparatus in accordance with a preferred embodiment of the present invention.
Figure 6B:
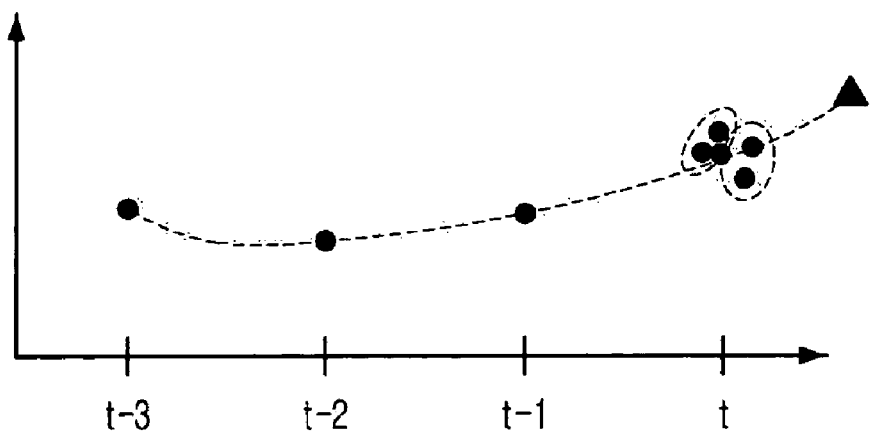

As show in FIG. 6A, four frames are inputted to the marker-free motion capture apparatus according to the present embodiment without filtering for initial setting.

After then, four feature candidates having three-dimensional coordinates are generated at a current time (t) as shown in FIG. 6. As described above with reference to FIG. 4, feature candidates within a threshold distance are grouped, which are expressed as a dotted line in FIG. 6B.

Features having a triangular shape are values predicted using the Kalman filtering scheme. That is, the features are predicted using a track of feature points of previous times (t−3, t−2, and t−1).

Figure 6C:
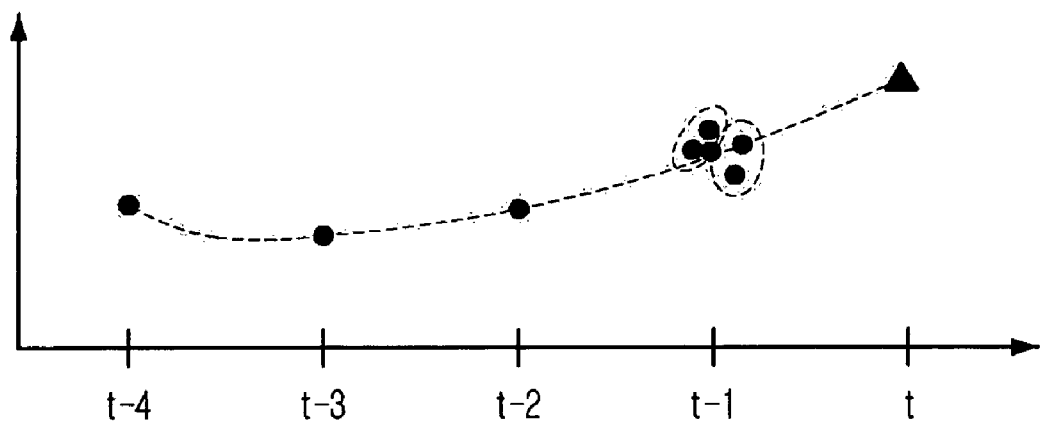

As shown in FIG. 6C, a frame of new image is inputted and features are extracted from the inputted frame to select a feature point among the grouped feature candidates. Inhere, the time (t) becomes a previous time (t−1). A location of feature point at a time (t) is modified using the Kalman filtering scheme based on locations of the extracted features and the predicted values. The extracted features are measured values from the new image.

The above described steps are widely known to those skilled in the art excepting the grouping step. Accordingly, detailed description thereof is omitted.

Figure 6D:
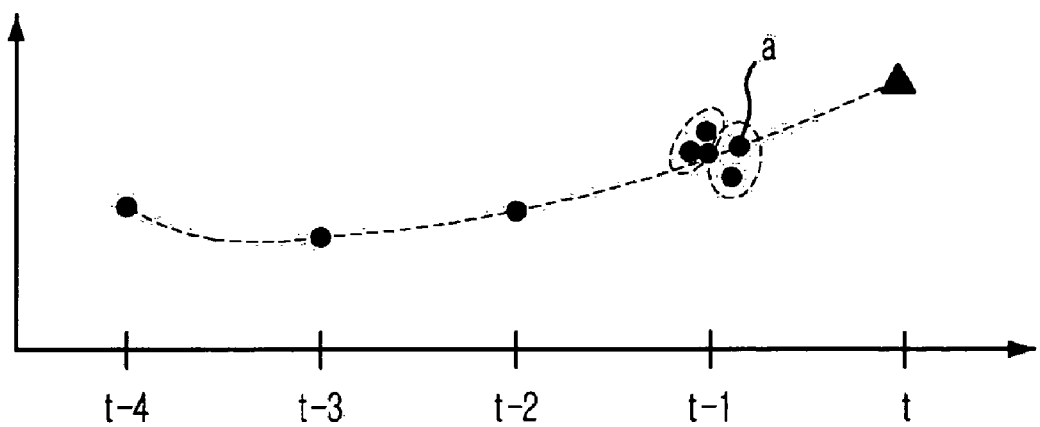

After then, a curve passing a feature point of a current time (t) and feature points of previous times (t−2, t−3, and t−4) is generated, and a feature candidate a is selected among the grouped feature candidate since the feature candidate a is closest to the generated curve, as shown in FIG. 6D.

Figure 6E:
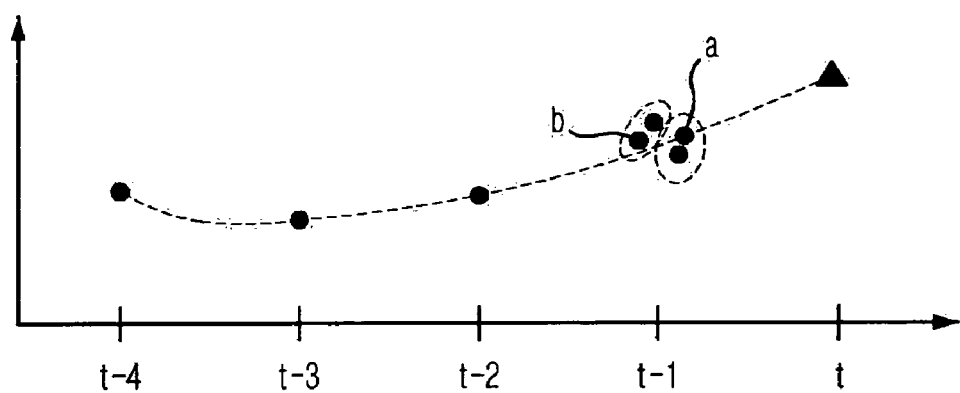

After selecting the feature candidate a, the feature candidate a among the grouped feature candidates is finally selected as a feature point of the previous time (t−1) as shown in FIG. 6E.

Figure 6F:
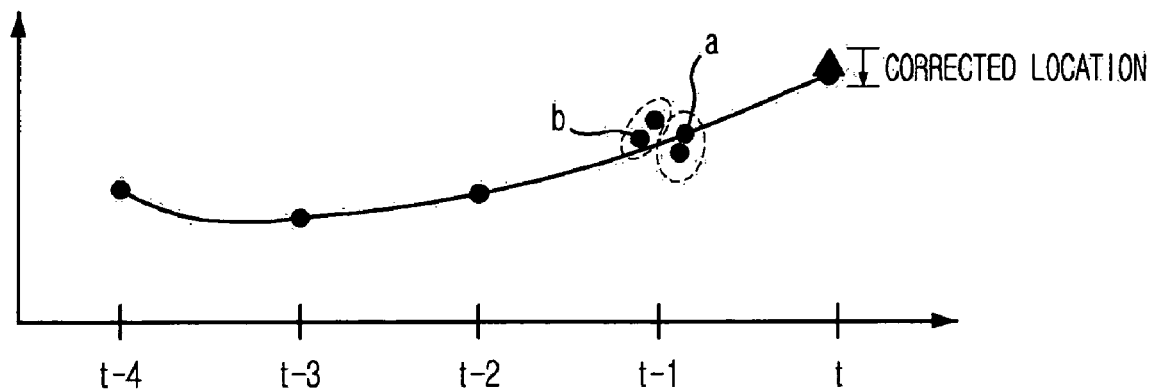

As shown in FIG. 6F, a curve passing the feature point of a previous time (t−1), the feature point of a previous time (t−2), the feature point of a previous time (t−3), and the feature point of a previous time (t−4). After generating the curve, the feature point of the current time (t) is corrected.

By correcting a target object through the above described tracking error correcting steps, the target object can be more accurately tracked according to the present embodiment.

Hereinafter, a method for correcting a tracking error in a marker-free motion capture apparatus in accordance with another embodiment of the present invention will be explained with reference to FIGS. 6A to 6F and FIG. 7.

As show in FIG. 6A, four frames are inputted to the marker-free motion capture apparatus according to the present embodiment without filtering for initial setting.

After then, four feature candidates having three-dimensional coordinates are generated at a current time (t) as shown in FIG. 6. As described above with reference to FIG. 4, feature candidates within a threshold distance are grouped, which are expressed as a dotted line in FIG. 6B.

Features having a triangular shape are values predicted using the Kalman filtering scheme. That is, the features are predicted using a track of feature points of previous times (t−3, t−2, and t−1).

As shown in FIG. 6C, a frame of new image is inputted and features are extracted from the inputted frame to select a feature point among the grouped feature candidates. Inhere, the time (t) becomes a previous time (t−1). A location of feature point at a time (t) is modified using the Kalman filtering scheme based on locations of the extracted features and the predicted values. The extracted features are measured values from the new image.

The above described steps are widely known to those skilled in the art excepting the grouping step. Accordingly, detailed description thereof is omitted.

After then, a curve passing a feature point of a current time (t) and feature points of previous times (t−2, t−3, and t−4) is generated, and a feature candidate a is selected among the grouped feature candidate since the feature candidate a is closest to the generated curve, as shown in FIG. 6D.

After selecting the feature candidate a, the feature candidate a among the grouped feature candidates is finally selected as a feature point of the previous time (t−1) as shown in FIG. 6E.

A feature candidate b is selected as virtual candidates among remained feature candidates because the feature candidate b is closest to the curve among the remained feature candidates. Also, a tracking routine is applied to the selected virtual candidates for virtually tracking.

After then, a curve passing the feature point of a previous time (t−1), the feature point of a previous time (t−2), the feature point of a previous time (t−3), and the feature point of a previous time (t−4). After generating the curve, the feature point of the current time (t) is corrected as shown in FIG. 6F.

If the feature points do not have feature points any more at lower nodes, the virtual candidate is selected to re-perform the tracking operation.

Figure 7:
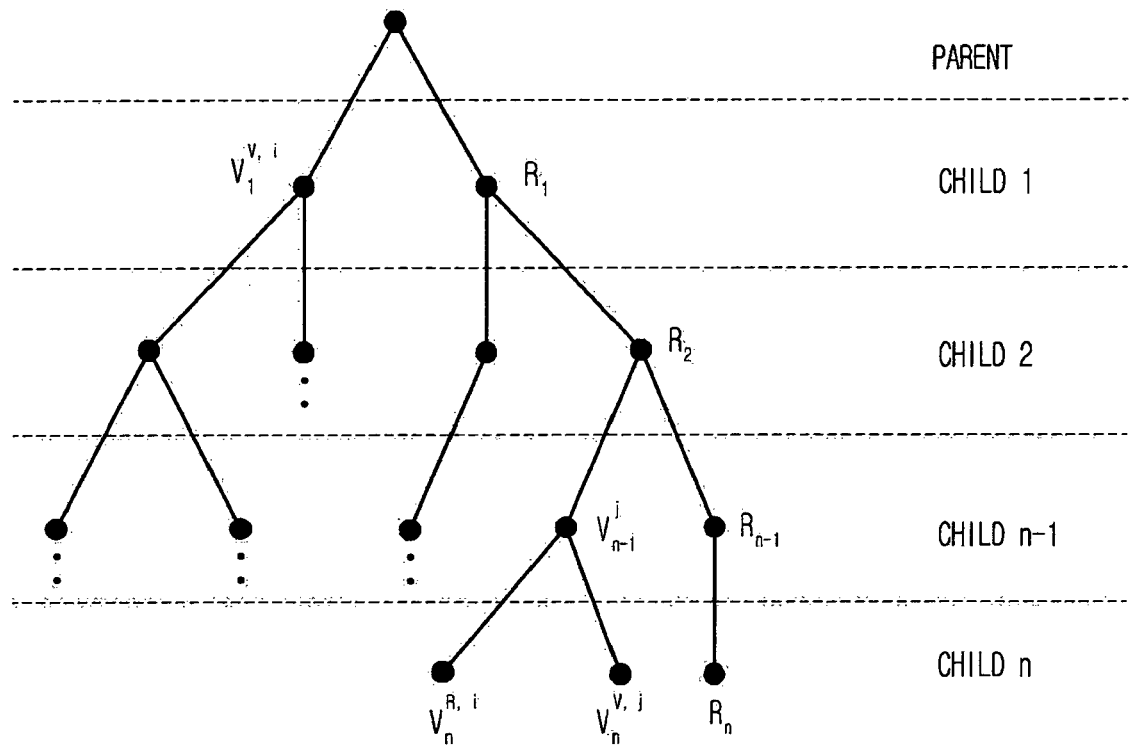
FIG. 7 is a tree diagram showing a tracking structure generated when correcting a tracking error in a marker-free motion capture apparatus in accordance with a preferred embodiment of the present invention.

It will be descried in more detail with reference to FIG. 7. As shown in FIG. 7, it is started from a parent node, and a feature point $R_1$ is selected and a virtual candidate $V_1^{Vj}$ is selected at a child node 1.

Also, a feature point $R_2$ is selected at a child node 2. A feature point $R_{n-1}$ is selected and a virtual candidate $V_{n-1}^j$ is selected at a child node n−1. Herein, a virtual tracking is continuously performed on the virtual candidate $V_{n-1}^j$.

Accordingly, a feature point $R_n$ is selected at a childe node n, and the virtual candidate $V_{n-1}^j$ has a virtual candidate $V_n^{Vj}$ in an $m^{th}$ virtual candidate at a child node n and a valid candidate $V_n^{Rj}$ in an $m^{th}$ virtual candidate of a child node n.

If the feature point $R_n$ of the child node n does not have feature points at it's lower nodes, a tracking operation is continuously performed by selecting the valid candidate $V_n^{Rj}$ as a new feature point. That is, when a tracking error is generated, the valid candidate in the virtual candidates is selected as the new feature point. Herein, since a track of the valid candidate $V_n^{Rj}$ is already tracked virtually, the tracking operation can be quickly re-performed without additional calculation steps.

As described above, single feature candidate generates a plurality of R candidates and V candidates with time. That is, a tree structure is formed by the generated R candidates and the V candidates from feature candidates. The tree structure occupies more memory spaces and a time of calculation also increases in proportional to the number of branches. However, when one of feature nodes is unnecessary, all nodes included to the unnecessary feature node can be deleted simultaneously.

In order to infinitely increase the tree structure, V candidates may be deleted from the tree structure. For example, if none of V candidates is selected as a R candidate (feature point) for 300 frames which is 10 seconds when the real-time marker-free motion capture system is operated as 30 frames in a second, the real-time marker-free motion capture system assumes that the R candidates are properly selected at 300 frames ago and deletes the V candidates from the tree structure.

Also, a V candidate is deleted when a R candidate and a V candidate simultaneously track an identical candidate because a curve of a cubic equation is formed by a tracking algorithm. Such a case is generated when two body part regions are joined and then apart again.

The method for correcting the tracking error according to the present embodiment can instantly and continuously perform a tracking operation without time delay when a tracking error having no feature points in a lower node during tracking a feature point.

Meanwhile, a major algorithm of the present invention may be modified according to an application field. At first, a definition of a distance between two feature candidates in an image and a definition of a distance for grouping in three-dimensional space may be varied. That is, a valid adjacent distance is dynamically changed according to an application field in two-dimensional image and three-dimensional image. Secondly, a time of deleting a virtual candidate from the tree structure can be changed too. In the present embodiment, 300 frames are set as the threshold time for deleting the virtual candidate since the marker-free motion capture system according to the present embodiment is operated in 30 frames per a second. However, the time is dynamically changed according to the application field.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

As described above, the marker-free motion capture apparatus and method according to the present invention performs a tracking operation by selecting a candidate having highest reliability among a plurality of candidates and also performs a virtual tracking operation internally on un-selected candidates when there is a plurality of reliable candidates located at a probabilistic predicted candidate location. If a tracking error is generated, the tracking error is instantly corrected by returning to a past time of tracking fail. Therefore, the target object can be accurately and rapidly traced.

Furthermore, the marker-free motion capture apparatus and method according to the present invention internally tracks the virtual candidate. Therefore, the marker-free motion capture apparatus and method according to the present invention can instantly and stably correct a tracking error without a time delay for additional calculation when a tracking error is generated because feature points are not in the lower nodes during tracking feature points.

The present application contains subject matter related to Korean patent application No. 2004-0103791 and 2005-0025158, filed with the Korean Intellectual Property Office on Dec. 9, 2004, and Mar. 25, 2005, respectively, the entire contents of which is incorporated herein by reference.

While the present invention has been described with respect to the particular embodiments, it will be apparent to those skilled in the art that various changes and modifications may be made without departing from the scope of the invention as defined in the following claims.

What is claimed is:

1. A marker-free motion capture apparatus having a function of correcting a tracking error, comprising:

a grouping means for grouping feature candidates located within a threshold distance on a three-dimensional space at a previous time (t−1);

a feature point selecting means for generating a first curve connecting a predetermined number of feature points, and selecting a feature candidate closest to the first curve among the grouped feature candidates as a feature point of a previous time (t−1);

a feature point correcting means for generating a second curve connecting a predetermined number of feature points including the feature point of a previous time (t−1) selected at the feature point selecting means, and correcting a feature point of a current time (t) calculated based on a Kalman filtering scheme using the second curve; and a controlling means for calculating a location of a feature point of each time using a Kalman filtering scheme and generally controlling the means of the marker-free motion capture apparatus.

2. A marker-free motion capture apparatus having a function of correcting a tracking error, comprising:

a grouping means for grouping feature candidates located within a threshold distance on a three-dimensional space at a previous time (t−1);

a feature point selecting means for generating a first curve connecting a predetermined number of feature points, selecting a feature candidate closest to the first curve among the grouped feature candidates as a feature point of a previous time (t−1), and selecting at least one of feature candidates which is next closest to the first curve as a virtual candidate of a previous time (t−1);

a virtual tracking means for tracking the virtual candidate of the previous time (t−1) selected at the feature point selecting means;

a feature point correcting means for generating a second curve connecting a predetermined number of feature points including the feature point of a previous time (t−1) selected at the feature point selecting means, and correcting a feature point of a current time (t) calculated based on a Kalman filtering scheme using the second curve; and a controlling means for registering a valid candidate in a virtual candidate tracked at the virtual tracking means when the corrected feature point of the current time (t) does not have feature points in a lower node.

3. The marker-free motion capture apparatus as recited in claim 2, wherein the controlling means deletes a virtual candidate (V candidate) from a tree structure by assuming that feature points (R candidate) are properly selected at a predetermined number of frames ago when the virtual candidates are not selected as the R candidate for a predetermined number of frames in order to prevent infinite increasing of the tree structure.

4. The marker-free motion capture apparatus as recited in claim 3, wherein the controlling means deletes the virtual candidate when the feature point and the virtual candidate simultaneously track an identical candidate for a predetermined number of frames.

5. The marker-free motion capture apparatus as recited in claim 4, wherein the predetermined number of frames is four when the first curve and the second curve are formed as a cubic equation.

6. The marker-free motion capture apparatus as recited in claim 1, wherein the feature point selecting means generates a curve of a cubic equation passing a feature point of a current time (t) and feature points of previous times (t−2, t−3, t−4) which are generated according to a Kalman filtering scheme.

7. The marker-free motion capture apparatus as recited in claim 1, wherein the feature point correcting means generates a curve of a cubic equation passing feature points of previous times (t−1, t−2, t−3).

8. A method of correcting a tracking error in a marker-free motion capture apparatus, the method comprising the steps of:

a) grouping feature candidates located within a threshold distance on a three-dimensional space at a previous time (t−1);

b) generating a first curve connecting a predetermined number of feature points c) selecting a feature candidate closest to the first curve among the grouped feature candidates as a feature point of a previous time (t−1);

d) generating a second curve connecting a predetermined number of feature points including the selected feature points of a previous time (t−1); and e) correcting a feature point of a current time (t) calculated based on a Kalman filtering scheme using the second curve.

9. A method of correcting a tracking error in a marker-free motion capture apparatus, the method comprising the steps of:

a) grouping feature candidates located within a threshold distance on a three-dimensional space at a previous time (t−1);

b) generating a first curve connecting a predetermined number of feature points;

c) selecting a feature candidate closest to the first curve among the grouped feature candidates as a feature point of a previous time (t−1);

d) selecting at least one of feature candidates which is secondly closest to the first curve as a virtual candidate of a previous time (t−1);

e) tracking the virtual candidate of the previous time (t−1);

f) generating a second curve connecting a predetermined number of feature points including the feature point of a previous time (t−1);

g) correcting a feature point of a current time (t) calculated based on a Kalman filtering scheme using the second curve; and h) registering a valid candidate in the tracked virtual candidate when the corrected feature point of the current time (t) does not have feature points in a lower node.

10. The method as recited in claim 9, further comprising the step of deleting a virtual candidate (V candidate) from a tree structure by assuming that feature points (R candidate) are properly selected at a predetermined number of frames ago when the virtual candidates are not selected as the R candidate for a predetermined number of frames in order to prevent infinite increasing of the tree structure.

11. The method as recited in claim 10, further comprising the step of deleting the virtual candidate when the feature point and the virtual candidate simultaneously track an identical candidate for a predetermined number of frames.

12. The method as recited in claim 11, wherein the predetermined number of frames is four when the first curve and the second curve are formed as a cubic equation.

13. The method as recited in claim 8, wherein in the step b), a curve of a cubic equation is generated to pass a feature point of a current time (t) and feature points of previous times (t−2, t−3, t−4) which are generated according to a Kalman filtering scheme.

14. The method as recited in claim 8, wherein in the step d) a curve of a cubic equation is generated to pass feature points of previous times (t−1, t−2, t−3).

* * * * *